United States Patent
Welch et al.

[11] Patent Number: 6,042,141
[45] Date of Patent: Mar. 28, 2000

[54] SIDE RESTRAINT ASSEMBLY

[75] Inventors: Jeffrey Allen Welch, St Clair Shores, Mich.; Bernd Uwe Zimmerbeutel, Remscheid, Germany; Kenneth Henry DeSaele, Armada, Mich.

[73] Assignee: General Motors Corporation, Detroit, Mich.

[21] Appl. No.: 08/918,833

[22] Filed: Aug. 26, 1997

[51] Int. Cl.⁷ .................................................. B60R 21/24
[52] U.S. Cl. .................... 280/729; 280/730.2; 280/743.1
[58] Field of Search ............................... 280/729, 730.2, 280/730.1, 743.1, 743.2, 749

[56] References Cited

U.S. PATENT DOCUMENTS

| | | |
|---|---|---|
| 3,687,485 | 8/1972 | Campbell . |
| 3,731,949 | 5/1973 | Radke ................................. 280/743.1 |
| 3,768,830 | 10/1973 | Hass ....................................... 280/729 |
| 3,844,581 | 10/1974 | Fox . |
| 3,953,049 | 4/1976 | Surace et al. . |
| 4,262,931 | 4/1981 | Strasser et al. ......................... 280/729 |
| 4,290,627 | 9/1981 | Cumming et al. ...................... 280/729 |
| 5,322,322 | 6/1994 | Bark et al. . |
| 5,462,308 | 10/1995 | Seki et al. . |
| 5,524,924 | 6/1996 | Steffens, Jr. et al. ................ 280/730.2 |
| 5,575,497 | 11/1996 | Suyama et al. ...................... 280/730.2 |
| 5,586,782 | 12/1996 | Zimmerman, II et al. .......... 280/730.2 |

FOREIGN PATENT DOCUMENTS

| | | |
|---|---|---|
| 3-276844 | 12/1991 | Japan . |
| 6-227348 | 8/1994 | Japan ................................ 280/730.2 |
| 2191450 | 12/1987 | United Kingdom . |
| 90/11914 | 10/1990 | WIPO . |

*Primary Examiner*—Peter C. English
*Attorney, Agent, or Firm*—Kathryn A. Marra

[57] ABSTRACT

A restraint assembly includes an inflator for generating inflation gas and a restraint cushion including an inflatable transfer portion in fluid communication with the inflator for initial inflation by the inflation gas. The cushion further includes an inflatable bladder portion in fluid communication with the transfer portion for extended inflation by transfer of inflation gas from the transfer portion into the bladder portion. The bladder portion has a fully inflated condition in which the bladder portion is filled with inflation gas from the transfer portion and in which the bladder portion engages the transfer portion to limit the amount of gas further transferred into the bladder portion and to seal the bladder portion such that inflation gas is held in the bladder portion for lengthened and extended inflation of the bladder portion even after deflation of the transfer portion for extended coverage of a preselected vehicle location.

25 Claims, 12 Drawing Sheets

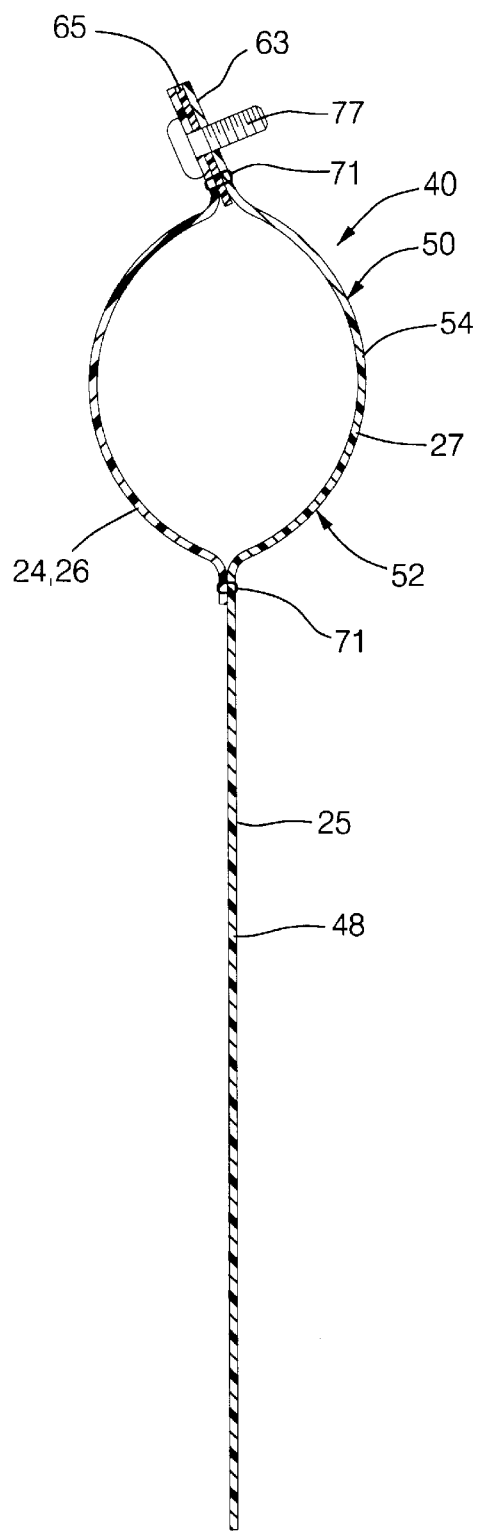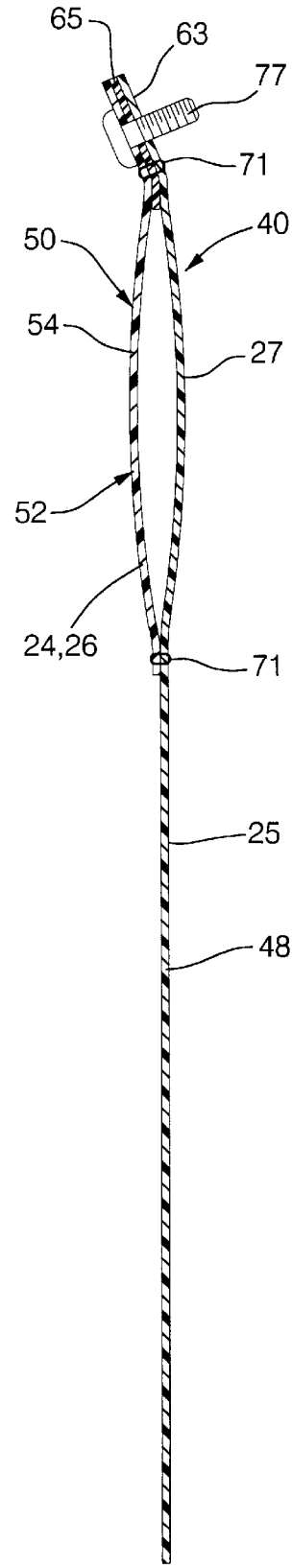
FIG. 4
FIG. 5

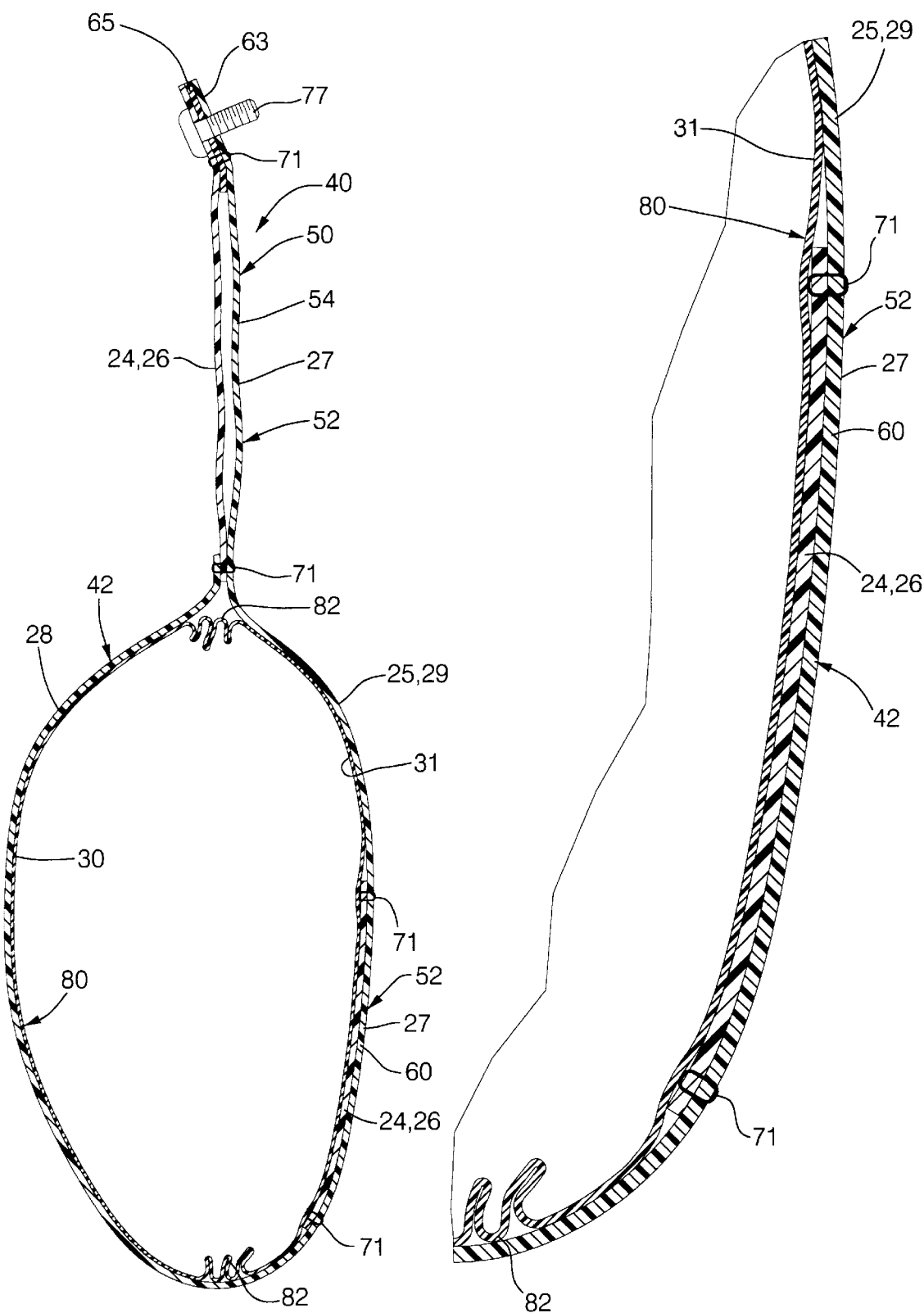

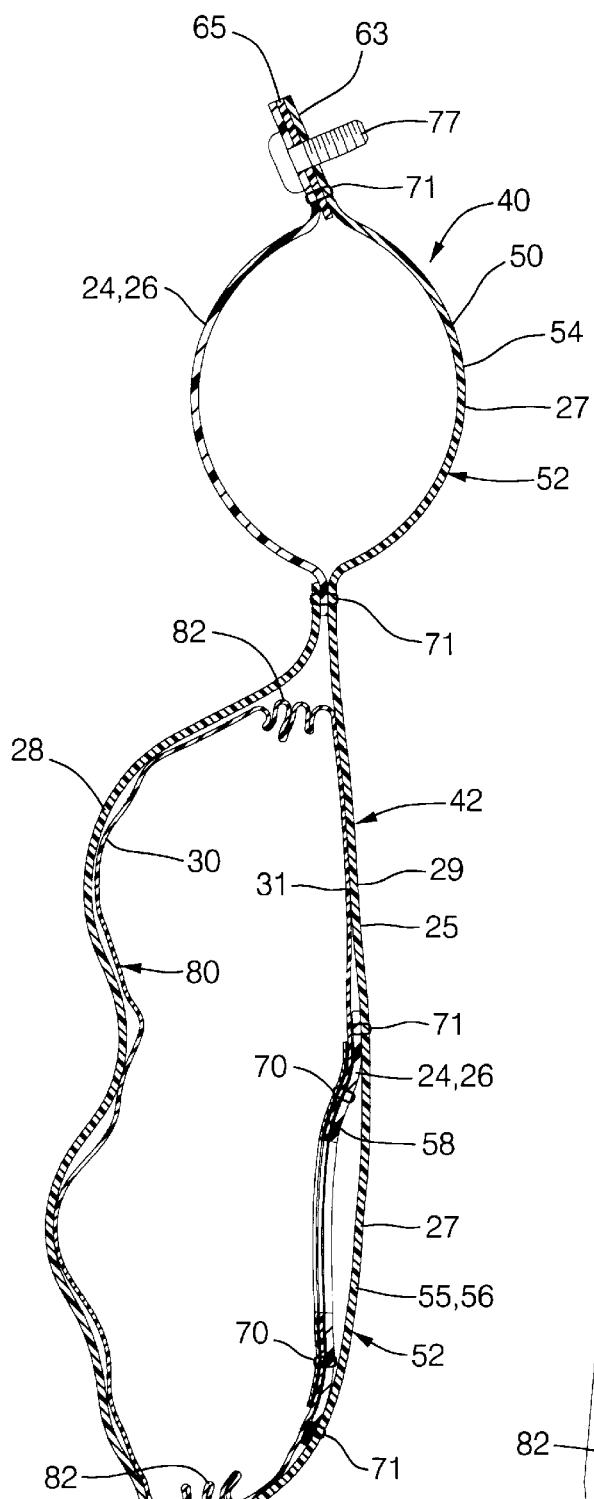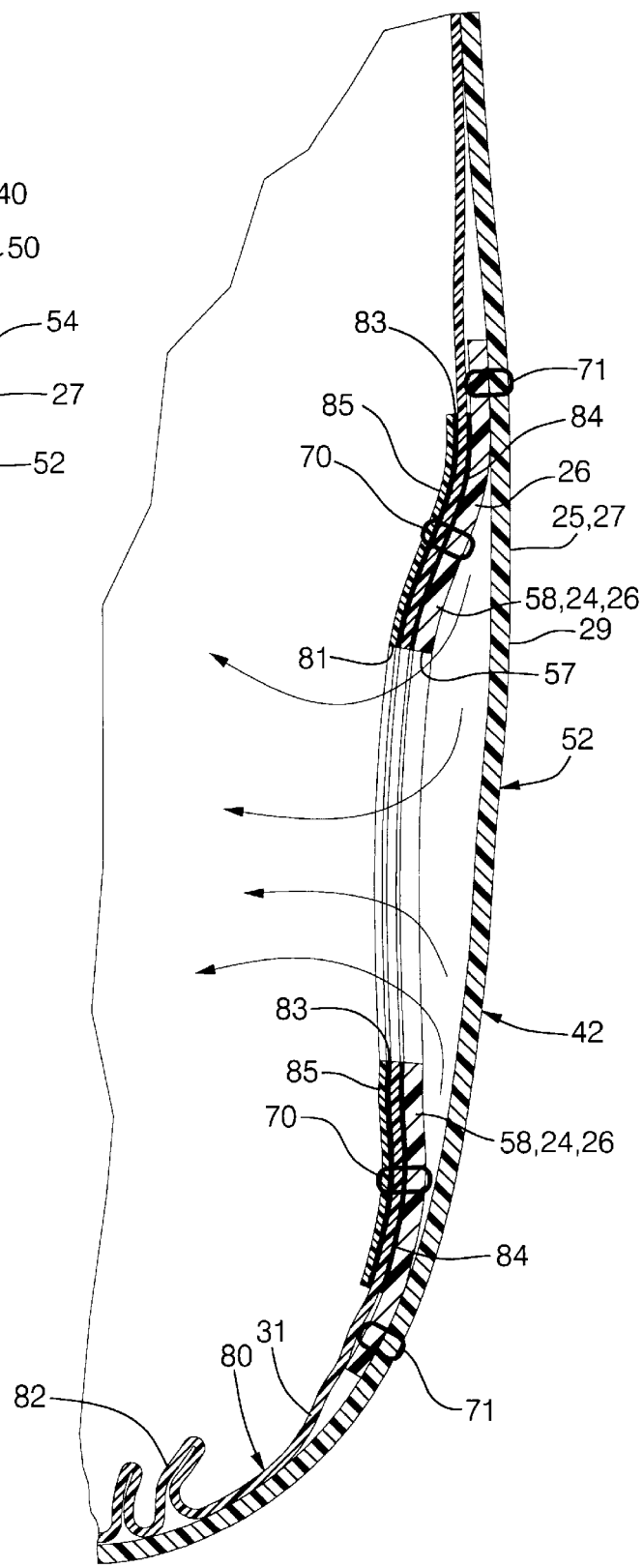
FIG. 10
FIG. 11

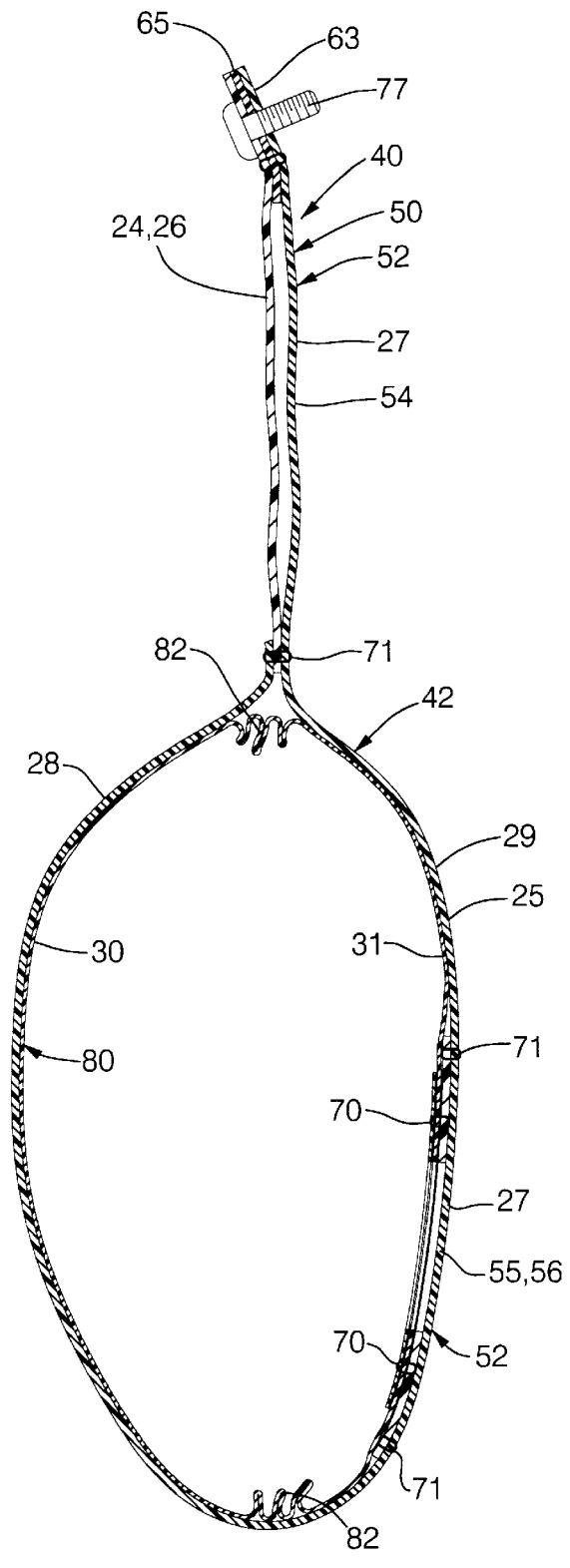
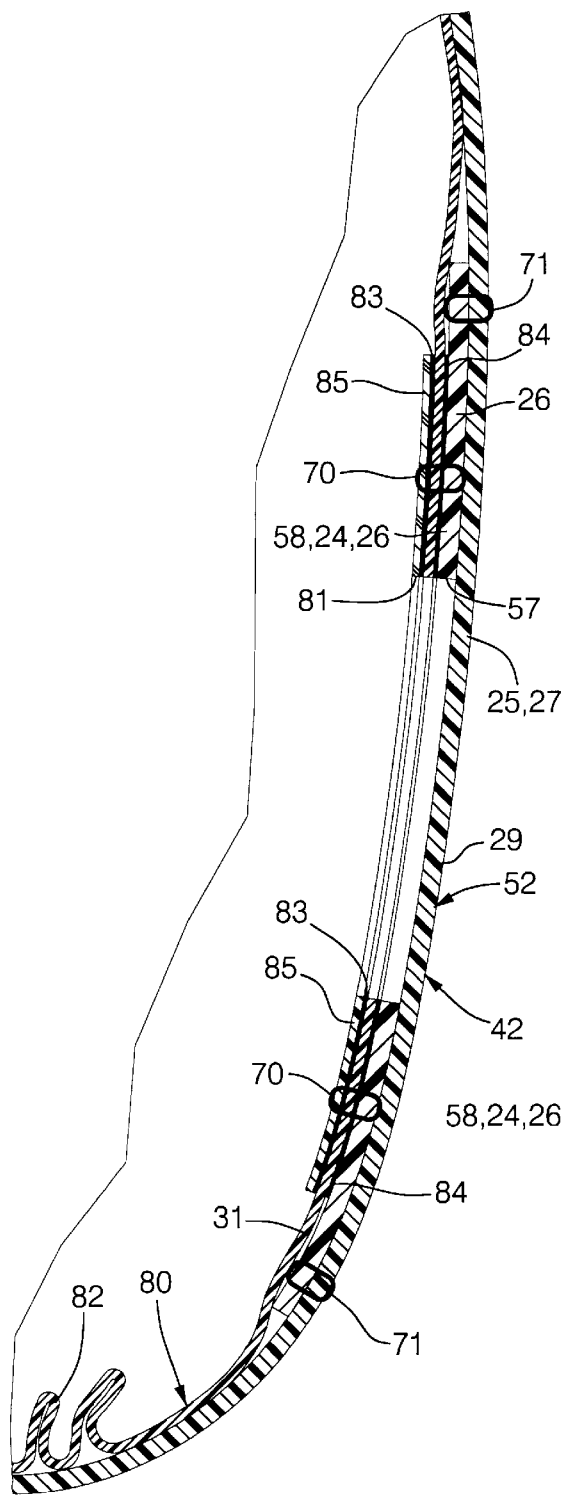
FIG. 12
FIG. 13

SIDE RESTRAINT ASSEMBLY

TECHNICAL FIELD

This invention relates to a side restraint assembly which provides initial and sustained inflated coverage in predetermined locations of a vehicle interior.

BACKGROUND OF THE INVENTION

It is well known in the prior art to provide air bag assemblies for the protection of vehicle occupants which are mounted on the vehicle steering wheel or instrument panels. It is also known to provide various air bag arrangements for protection of vehicle occupants during events in which the occupant is directed towards the side of the vehicle. For example, it is known to provide air bags for side impact protection which have an upper head portion and a lower torso portion which simultaneously inflate for protection of a vehicle occupant during a side impact event. It is also known to provide one or more tubular-shaped air bags which inflate to a rigid condition to protect generally the head portion of a vehicle occupant. However, these arrangements are typically directed to protection of either a front or a rear seat occupant. In addition, these arrangements require a substantial amount of inflation gas to quickly fill an inflatable restraint cushion with a relatively large volume for inflation. Furthermore, these arrangements typically offer inflated coverage to a single predetermined location in the vehicle for a limited amount of time during an initial event that triggers the inflation. Also, the packaging of large fabric air bags may be cumbersome, especially when packaging the restraint assembly in small packaging locations such as the vehicle roof or upper side rails.

SUMMARY OF THE INVENTION

The present invention provides alternatives and advantages over the prior art by providing a restraint assembly which provides initial inflated coverage and extended inflated coverage of predetermined vehicle locations. Advantageously, the assembly preferably provides sustained or lengthened inflated coverage of a predetermined vehicle location for extended protection of a vehicle occupant during any secondary events subsequent to an initial event which triggers release of inflation gas and deployment of an inflatable restraint device. Also advantageously, the assembly efficiently utilizes inflation gas for initial and extended inflated coverage of the vehicle at predetermined locations such that selective initial and extended inflated coverage is accomplished for longer amounts of time while utilizing less inflation gas. In addition, the restraint assembly preferably includes noninflatable portions that provide noninflated vehicle coverage and restraint, but which do not need to be filled with inflation gas.

These advantages and alternatives are accomplished in a preferred form of the invention by providing a restraint assembly including an inflator for generating inflation gas and a restraint cushion including an inflatable transfer portion in fluid communication with the inflator for initial inflation by the inflation gas. The cushion further includes an inflatable bladder portion in fluid communication with the transfer portion for extended inflation by transfer of inflation gas from the transfer portion into the bladder portion. The bladder portion has a fully inflated condition in which the bladder portion is filled with inflation gas from the transfer portion and in which the bladder portion engages the transfer portion to limit the amount of gas further transferred into the bladder portion and to seal the bladder portion such that inflation gas is held in the bladder portion for lengthened and extended inflation of the bladder portion even after deflation of the transfer portion for extended coverage of a preselected vehicle location.

Preferably, the transfer portion includes an inboard transfer wall and an outboard transfer wall and the bladder portion is positioned inboard of the inboard transfer wall. Advantageously, the bladder portion has a fully inflated condition in which the bladder portion forces the inboard and outboard walls of the transfer portion together to substantially seal off the continued transfer of inflation gas into the bladder portion and to provide extended and lengthened inflation of the bladder portion even after deflation of the transfer portion.

Preferably, the cushion includes a bladder housing enclosing the bladder portion. The bladder portion floats within the bladder housing and lacks direct securement to the bladder housing. Preferably, the bladder portion has a volume which is greater than a volume of the bladder housing such that the bladder portion is constrained by the bladder housing and conforms to the shape of the bladder housing when the bladder portion is fully inflated. Preferably, the bladder portion includes wrinkled portions when the bladder portion is in the fully inflated condition due to the constraints of the bladder housing. Advantageously in a preferred form of the invention, the bladder housing protects the bladder portion prior to inflation and prevents overstretching of the bladder portion when it is fully inflated. Preferably, the bladder portion is made of a thin plastic film and the transfer portion and bladder housing are made of a woven fabric material. The bladder portion is preferably formed separate and independent from the transfer portion and the bladder housing and is only directly connected to the transfer portion at the bladder opening through which inflation gas is transferred into the bladder portion.

According to other preferred aspects of the invention, the transfer portion provides initial inflated coverage of a first predetermined vehicle location and the bladder portion provides lengthened, extended inflated coverage of a second predetermined vehicle location even after deflation of the transfer portion.

BRIEF DESCRIPTION OF THE DRAWINGS

The present invention will now be described, by way of example, with reference to the accompanying drawings, in which:

FIG. 4 is a sectional view taken along line 4—4 of FIG. 1;

FIG. 5 is a sectional view similar to FIG. 4, but taken when the bladder portion is in the fully inflated condition and when the transfer portion is in the substantially deflated condition;

FIG. 8 is a sectional view similar to FIG. 6, but taken when the bladder portion is in the fully inflated condition and when the transfer portion is in the substantially deflated condition;

FIG. 9 is an enlarged sectional view of a portion of FIG. 8 and showing the sealing of the transfer portion by the bladder portion in the fully inflated condition;

FIG. 10 is a sectional view taken along line 10—10 of FIG. 1 and showing the bladder portion including the bladder opening and the transfer portion including the transfer opening;

FIG. 11 is an enlarged sectional view of a portion of FIG. 10 and showing the transfer of inflation gas from the transfer portion into the bladder portion;

FIG. 12 is a sectional view similar to FIG. 10, but taken when the bladder portion is in the fully inflated condition and when the transfer portion is in the substantially deflated condition such that the bladder portion substantially seals the path into the transfer portion and temporarily sustains an inflated condition in the bladder portion;

FIG. 13 is an enlarged sectional view of a portion of FIG. 12 and showing the sealing of the transfer portion by the bladder portion in the fully inflated condition;

DESCRIPTION OF THE PREFERRED EMBODIMENT

Figure 1:
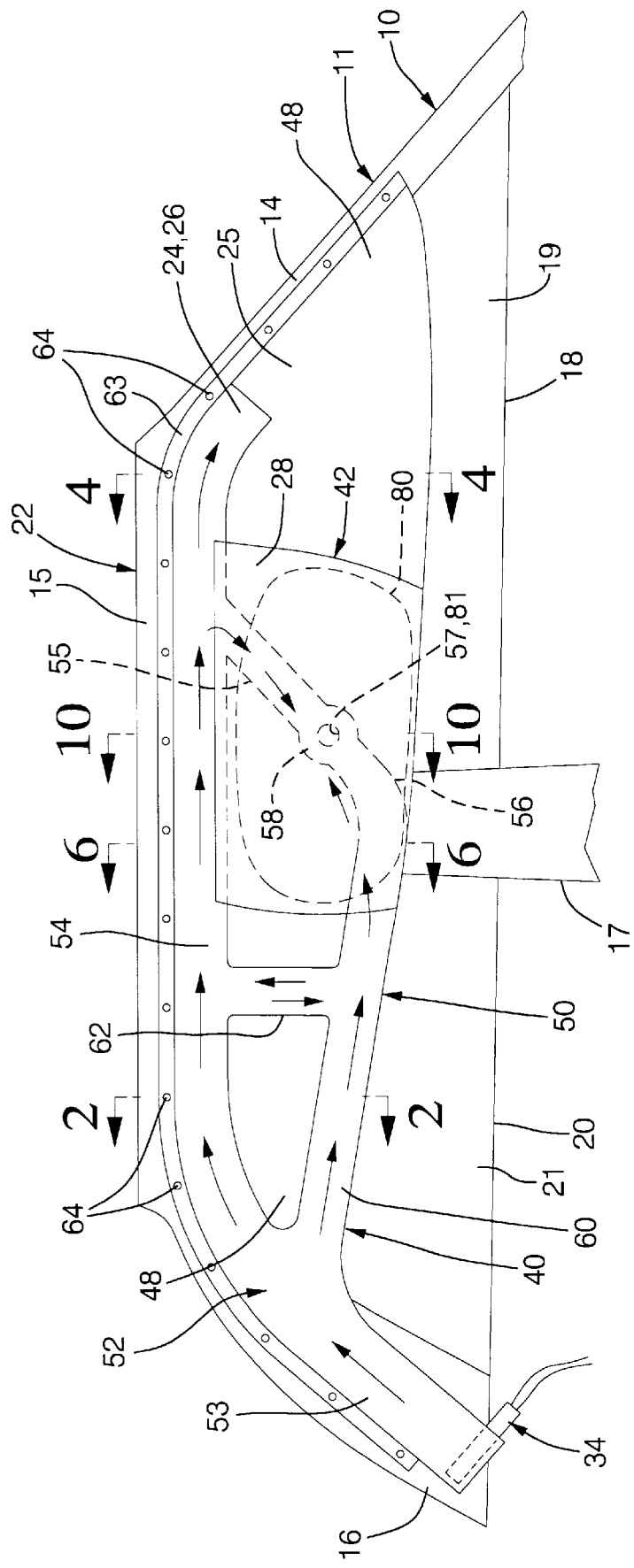
FIG. 1 is a perspective view of an interior vehicle side structure showing a restraint assembly in a deployed condition during initial inflation of a transfer portion and prior to full inflation of a bladder portion.

Referring to FIG. 1, a vehicle 10 includes an upper interior vehicle side portion 11 including a forward A-pillar 14 extending along the side of a vehicle windshield (not shown). The A-pillar 14 extends upward and rearward for intersection with a side roof rail 15 which extends further rearward from the A-pillar 14 along the longitudinal length of the interior vehicle side portion 11 for intersection with a rearward C-pillar 16 which extends downward and rearward from the intersection with the roof rail 15. The interior vehicle side portion 11 further includes a B-pillar 17 which intersects the roof rail 15 at a location spaced between the A-pillar 14 and C-pillar 16. The B-pillar 17 generally provides a side division between a front seating location in the vehicle 10 and a rear seating location. The vehicle 10 includes a front door portion 18 having a movable front side window 19 and a rear door portion 20 having a movable rear side window 21. It will be appreciated that the front and rear side windows 19, 21 are respectively mounted on lower portions of the front and rear door portions 18, 20. The combination of the A-pillar 14, B-pillar 17, C-pillar 16 and side roof rail 15 provide the interior vehicle side structure 22. It will further be appreciated that FIG. 1 shows one side portion 11 of the vehicle 10 and that there will be a substantially similar opposite interior vehicle side portion 11 on the opposing lateral side of the vehicle 10.

A side restraint assembly is generally designated as 40. The restraint assembly 40 includes the primary components of an inflator 34 and a restraint cushion 50. The cushion 50 preferably provides selected inflated and noninflated side coverage to the interior vehicle side structure 22 during initial impact events and subsequent impact events, as described further hereinafter. The inflator 34 may be of any suitable construction for generating inflation gas to inflate the cushion 50. The inflator 34 preferably includes discharge ports (not shown) on one end through which the inflation gas is delivered into the cushion 50. Preferably, the inflator 34 is partially enclosed within the cushion 50 for direct delivery of inflation gas into the cushion 50. The inflator 34 is preferably shown as having an elongated cylindrical shape, however it will be appreciated that the inflator 34 may also have a disc shape or any other suitable inflator shape. It will further be appreciated that the elongated cylindrical inflator 34 could be alternately be turned 90 degrees to be in line with the cushion 50 and the entry of the inflation gas. The inflator 34 is preferably mounted to the inner sheet metal on the C-pillar 16 and the inflator 34 may partially extend through an access hole in the rear shelf support to be hidden from view from the vehicle interior. It will be appreciated that the inflator 34 could be mounted to the vehicle 10 using a suitable inflator bracket (not shown) such as the one hereby incorporated by reference as shown in co-pending application U.S. Ser. No. 08/767,884, filed on Dec. 17, 1996 and assigned to General Motors Corporation.

As shown in the deployed condition in FIG. 1, the cushion 50 preferably extends substantially across the upper interior vehicle side portion 11 including covering the A-pillar 14, B-pillar 17, C-pillar 16, roof rail 15 and side windows 19, 21. The cushion 50 includes a transfer portion 52, a bladder housing 42 and a bladder portion 80. The transfer portion 52 preferably has a generally tubular shape and includes an entry portion 53 for directly receiving inflation gas from the inflator 34. The transfer portion 52 preferably includes an upper transfer tube 54 which extends generally upward and forward from the entry portion 53. The upper transfer tube 54 is positioned inboard of and follows the contour of the vehicle C-pillar 16, roof rail 15 and extends at least partially over the A-pillar 14 to provide inflated coverage of these vehicle locations. The upper transfer tube 54 preferably need not extend over the entire A-pillar 14 since preferably the type of side impact event which triggers the inflator 34 in this particular embodiment will typically not involve forces that direct an occupant towards the forward, lower portion of the A-pillar 14.

The transfer portion 52 further includes a lower transfer tube 60 which extends generally forward from the entry portion 53 and across the inboard side of the B-pillar 17. The transfer portion 52 further includes a lower bladder connector tube 56 which extends upwardly from the lower transfer tube 60. The transfer portion 52 further includes an upper bladder connector tube 55 which extends generally downward and rearward from the upper transfer tube 54. The upper and lower bladder connector tubes 55, 56 intersect each other at a filler neck portion 58 located on the transfer portion 52. The filler neck portion 58 is an enlarged portion of the transfer portion 52 which surrounds a transfer opening 57 provided in the transfer portion 52. The transfer opening 57 is aligned with a bladder opening 81 in the bladder portion 80 for transferring inflation gas into the bladder portion 80, as described further hereinafter. The upper transfer tube 54 and the lower transfer tube 60 are in fluid communication at the filler neck portion 58 at the intersection of the upper and lower bladder connector tubes 55, 56. In addition, the transfer portion 52 preferably includes a generally vertically oriented cross tube 62 which extends between and connects the upper and lower transfer tubes 54, 60 to each other for fluid communication therebetween. Thus, the cross tube 62 preferably provides a path for equalization of gas pressure between the upper and lower transfer tubes 54, 60 during initial inflation of the cushion 50. The cross tube 62 is preferably spaced longitudinally apart from the bladder housing 42 and the bladder portion 80, preferably between the bladder portion 80 and the inflator 34 location. While the cross tube 62 is shown as generally vertical, it will be appreciated that other orientations are possible.

Figure 14:
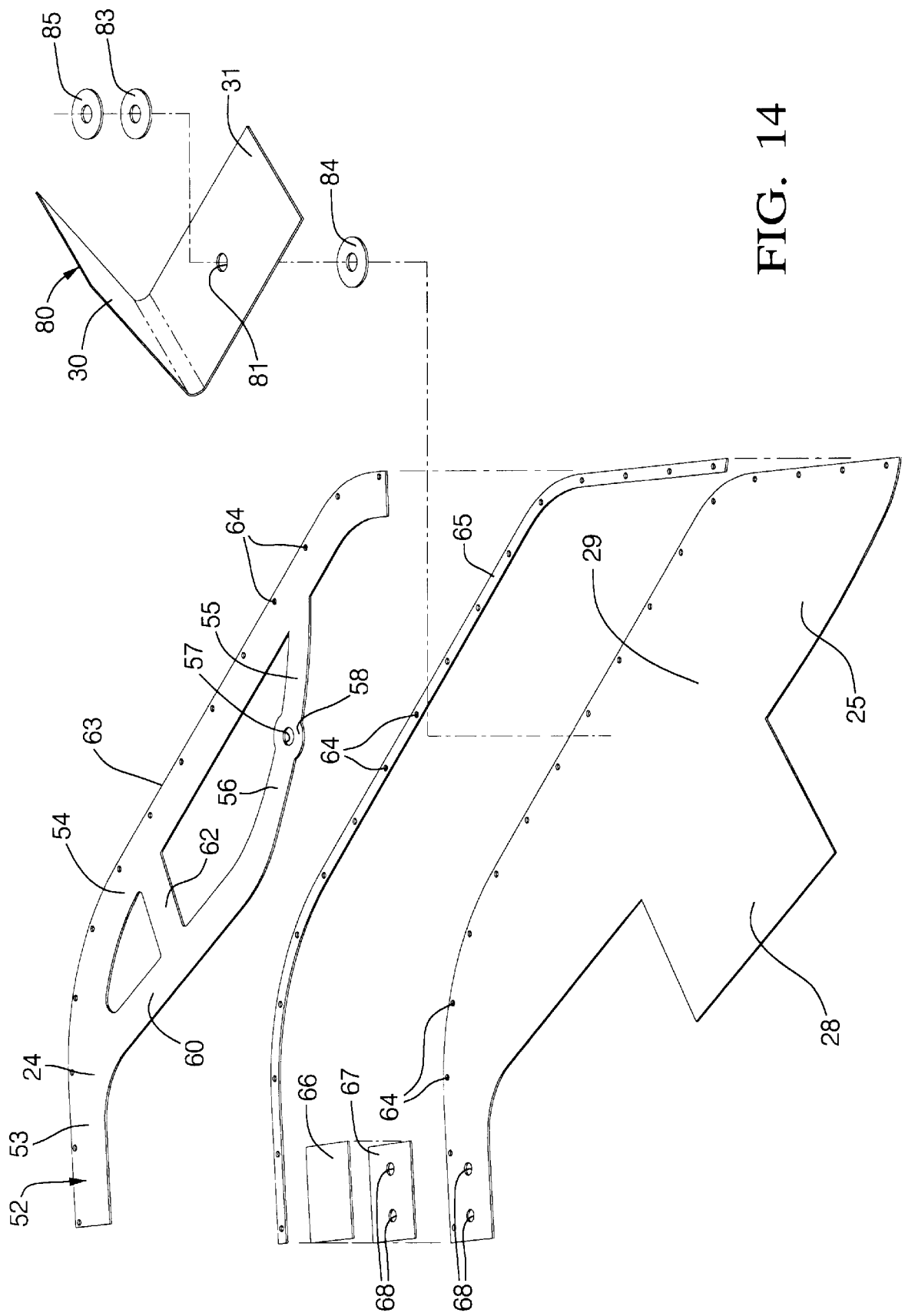
FIG. 14 shows a perspective exploded view of the components forming the restraint cushion including the bladder portion.

As best shown in FIG. 14, the cushion 50 includes an inboard panel 24 and an outboard panel 25. The inboard and outboard panels 24, 25 are preferably made of a woven fabric material typically used for air bag construction. The cushion material preferably has a coating, such as neoprene. However, the cushion material may also be uncoated, but preferably is coated on the inboard and outboard panels 24, 25 adjacent the bladder portion 80 to assist with sealing of the transfer portion 52, as described further hereinafter. The inboard panel 24 is cut to the shape of the transfer portion 52 and selectively overlays and is attached to the outboard panel 25 to form the tubes of the transfer portion 52. The transfer portion 52 includes an inboard transfer wall 26 and an outboard transfer wall 27 formed by portions of the inboard and outboard panels, 24, 25, respectively.

As best shown in FIGS. 1, and 6–14, the cushion 50 also preferably includes a bladder housing 42 which is preferably positioned inboard of the B-pillar 17. The bladder housing 42 is formed of an upwardly folded extension of the outboard panel 25 being an inboard bladder housing wall 28 such that the bladder housing 42 includes an inboard bladder housing wall 28 and an outboard bladder housing wall 29. The bladder housing 42 is also preferably formed of a woven fabric material or any material suitable for air bag construction and is preferably an integral piece of the cushion 50. Preferably, an interior surface of the bladder housing 42 especially on the outboard bladder housing wall 29, is coated for providing a high friction surface against which the bladder portion 80 adheres when fully inflated to sustain inflation of the bladder portion 80 and to assist in sealing the transfer portion 52, as described further hereinafter. As best shown in FIGS. 1, and 8–13, the bladder connector tubes 55, 56 of the transfer portion 52 are positioned within the bladder housing 42 between the outboard bladder housing wall 29 and the bladder portion 80. Advantageously, the bladder connector tubes 55, 56 are positioned for being pinched off or sealed by the inflated bladder portion 80, as described further hereinafter. Also, the bladder housing 42 substantially encloses and houses the bladder portion 80 therein to protect the bladder portion 80 from damage and to limit the inflation of the bladder portion 80 to prevent rupture of the bladder portion 80 in the fully inflated condition. Accordingly, the bladder housing 42 preferably has a volume which is slightly smaller than a volume of the bladder portion 80 to prevent the rupture of the bladder portion 80 and to support the inflated bladder portion 80. Thus, the bladder housing 42 restrains the bladder portion 80 and prevents overstretching of the bladder portion 80 during its inflation. It will be appreciated that the bladder housing 42 is not in fluid communication with the transfer portion 52 or the bladder portion 80 and preferably inflation gas does leak into the bladder housing 42.

Referring to FIGS. 1 and 6–14, the cushion 50 preferably includes a bladder portion 80 housed within the bladder housing 42. Advantageously, the bladder portion 80 is self-sealing and provides sustained inflated coverage of a predetermined portion of the vehicle 10 which the bladder portion 80 covers as described further hereinafter. The bladder portion 80 is preferably made of a thin membrane or film of non-porous material, preferably being a plastic material. Most preferably, the bladder portion 80 is made of a thin polyethylene film or a mylar film being about 0.001–0.004 inches (0.025–0.1 mm) in thickness, or other similar materials such as those commonly used for mylar balloons, plastic trash bags, dry cleaning bags, or drop cloths. Accordingly, the bladder portion 80 is advantageously made of a readily available material. It will be appreciated that the thickness of the materials of the cushion 50, especially the bladder portion 80, are shown somewhat enlarged in the drawings for clarity. The bladder portion 80 is preferably generally free floating within the bladder housing 42 and is preferably not directly connected to the bladder housing 42. The bladder portion 80 is only directly connected to the filler neck portion 58 of the transfer portion 52 around the bladder opening 81, as described further hereinafter.

As best shown in FIGS. 6–13, the bladder portion 80 includes an inboard bladder wall 30 and an outboard bladder wall 31. The outboard bladder wall 31 is preferably located directly inboard of the inboard transfer wall 26 on the transfer portion 52 especially at the upper and lower bladder connector tubes 55, 56 and the filler neck portion 58. The bladder portion 80 includes a bladder opening 81 which is aligned with the transfer opening 57 on the transfer portion 52. Thus, the bladder portion 80 is in fluid communication with the transfer portion 52 via the openings 57, 81. As best shown in FIG. 8 with the bladder portion 80 in the fully inflated condition, the bladder portion 80 is preferably enclosed within the bladder housing 42 such that the thin, delicate bladder portion 80 is protected prior to and during deployment. In addition, the bladder portion 80 preferably has a volume which is slightly greater, preferably by about 10%, than a volume of the bladder housing 42 such that when the bladder portion 80 is fully inflated it conforms to the shape of the bladder housing 42 and includes wrinkled portions 82 being folded up bladder material, especially in the corners of the bladder housing 42. Thus, it will be appreciated that in the fully inflated condition, the bladder portion 80 is not fully tensioned and cannot become over stretched such that it will not rupture during full inflation as assisted by the constraint of the bladder housing 42 and the sealing of the transfer portion 52 to limit the input of inflation gas, as described further hereinafter. Thus, the bladder portion 80 in the fully inflated condition is preferably not placed fully in tension at all surfaces and the volume of the bladder housing 42 limits the inflation of the bladder portion 80. However, it will be appreciated that the bladder portion 80 could alternately be made of a less delicate material, such as an elastomeric material or fabric, that may not need to be sized having a smaller volume than the bladder housing 42.

It is highly desirable that the bladder portion 80 be constructed such that it is leak proof, except at the bladder opening 81. Preferably as best shown in FIG. 14, the bladder portion 80 may be constructed of a sheet of plastic film which is folded over onto itself and heat sealed along the overlying outer mating edges. The bladder portion 80 is shown as generally rectangular, but could be made to almost any shape to provide selected coverage to chosen areas of the vehicle 10. Prior to closing the bladder portion 80 during construction, it is desirable to provide the bladder opening 81 in the outboard bladder wall 31. In addition it is desirable to place first and second adhesive film rings 83, 84 on the inside and outside surfaces of the outboard bladder wall 31 around the bladder opening 81 and to place a fabric reinforcement ring 85 atop the first adhesive film ring 83 on the inside of the bladder portion 80. The first adhesive film ring 83 holds the fabric ring 85 to the bladder portion 80 and seals punctures created when the fabric ring 85 is sewn to the bladder portion 80 and prevents ripping or tearing of the bladder portion 80 along the location of bladder seams 70 which are also sewn to the inboard transfer wall 26 of the transfer portion 52 as shown in FIGS. 10–13. In addition, the second adhesive film ring 84 prevents a leak path from forming between the bladder portion 80 and the interior of the bladder housing 42 when the bladder portion 80 is fully inflated as best shown in FIG. 13. Furthermore, all of the rings 83, 84, 85 provide a surface for sewing seams and help prevent tearing or ripping of the bladder portion 80 during sewing attachment to the transfer portion 52 at bladder seams 70 and thus prevent leaks in the bladder portion 80. It will be appreciated that the connection of the bladder portion 80 to the transfer portion 52 need not be by sewn bladder seams 70, but could be by other methods of attachment such as adhesives or other bonding.

Figures 6, 7:
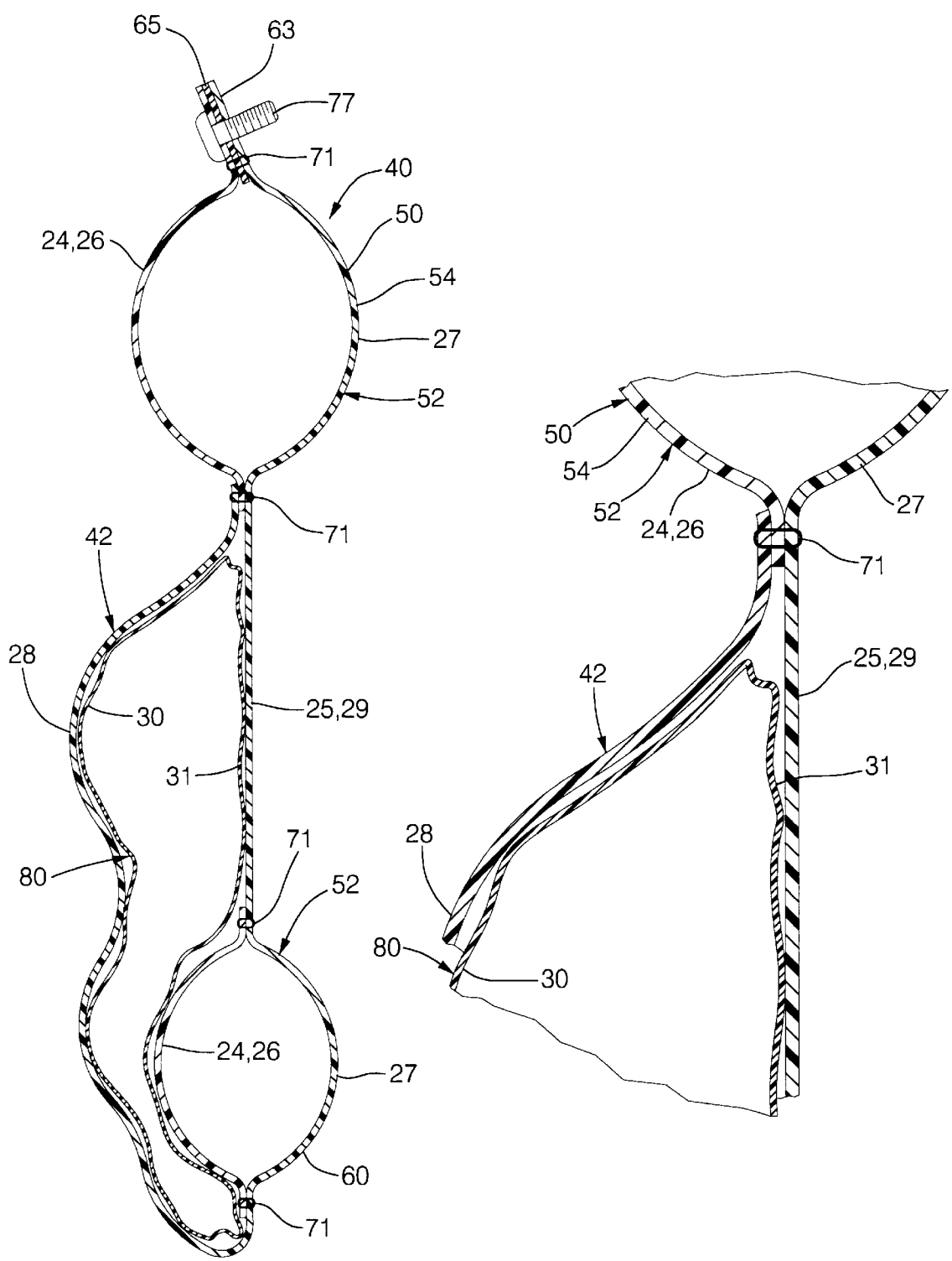
FIG. 6 is a sectional view taken along line 6—6 of FIG. 1.
FIG. 7 is an enlarged sectional view of a portion of FIG. 6 and showing the connection of a bladder housing to the transfer portion.

As best shown in FIG. 14, the cushion 50 is preferably assembled as follows. The cushion 50 includes an outboard panel 25 which is cut to the overall size and shape of the cushion 50. The inboard panel 24 is cut to the shape of the transfer portion 52 and selectively overlies the inner side of the outboard panel 25 and is attached thereto to provide the tubular shape of the transfer portion 52. A reinforcement strip 65 may be placed along an upper edge 63 of the cushion 50 for reinforcement of the attachment of the cushion 50 to the vehicle 10. Preferably, the inboard and outboard panels 24, 25 are sewn together at panel seams 71 as best shown in FIG. 6. The outboard panel 25, reinforcement strip 65, and inboard panel 24 each preferably include aligned mounting apertures 64 through which fasteners 77, such as those shown in FIGS. 2 and 3, can be inserted to attach the upper edge 63 of the cushion 50 to the interior vehicle side structure 22, preferably along the A-pillar 14, roof rail 15, and C-pillar 16. Preferably, the entry portion 53 of the transfer portion 52 includes inflator reinforcement patches 66, 67 for attachment to the inboard and outboard panels 24, 25, respectively, for providing protection to the cushion 50 from heat associated with inflation gas discharge and to provide strength to the area of the cushion 50 near the inflator 34. Preferably, the outboard inflator reinforcement patch 67 and the outboard panel 25 include alignable openings 68 through which mounting lugs (not shown) from the inflator 34 can extend for attaching the inflator 34 to the vehicle 10. However, it will be appreciated that many arrangements are possible for mounting the inflator 34 in fluid communication with the entry portion 53 and for protecting the cushion 50 from heat associated with inflation gas, including the use of the inflator mounting bracket previously incorporated by reference.

The outboard panel 25 preferably includes the inboard bladder housing wall 28 as an integral extension of the outboard panel 25 and also provides the outboard bladder housing wall 29. The bladder portion 80 and the rings 83, 84, and 85 are previously assembled as a subassembly, as described above. As best shown in FIG. 6, the bladder portion 80 is housed within and captured within the bladder housing 42. As best shown in FIGS. 10 and 11, the bladder portion 80 floats within the bladder housing 42 and is captured therein by laying the bladder portion 80 on the outboard bladder housing wall 29 and folding the inboard bladder housing wall 28 up and over the bladder portion 80 and sewing the bladder housing 42 closed along its edges. Most conveniently, the same panel seams 71 are also used to close the bladder housing 42. As best shown in FIGS. 10 and 11, it is desirable that the bladder portion 80 be connected to the inboard panel 24 at the filler neck portion 58 as best shown in FIG. 10. Preferably, the bladder portion 80 subassembly including the rings 83, 84, 85 is initially connected to the filler neck portion 58 by the second adhesive film ring 84 and then sewn to the inboard panel 24 at bladder seams 70 as best shown in FIGS. 10 and 11. It will be appreciated that the bladder portion 80 is preferably connected to the inboard transfer wall 26 at the filler neck portion 58 prior to closing the bladder housing 42 and prior to attaching the inboard panel 24 to the outboard panel 25.

Referring to FIG. 1, the cushion 50 is preferably stored in a folded condition prior to deployment and many arrangements are possible. For example, the cushion 50 may include the upper edge 63 which is attached to the vehicle 10 at the A-pillar 14, side roof rail 15, and C-pillar 16 at the mounting apertures 64 such as by fasteners 77. The cushion 50 is preferably stored in a folded condition beneath a vehicle molding or a vehicle headliner out of sight until it is deployed. Advantageously, since the entire cushion 50 is not inflatable as described below, the cushion 50 includes portions which are a single layer and that allow for a more compact cushion 50 for storage. Upon deployment, the inflating transfer portion 52 bursts open the molding or other housing which stores the cushion 50 prior to deployment.

It will be appreciated that the entire cushion 50 is not inflatable as is common in the prior art. Instead, the cushion 50 is selectively inflatable for various amounts of time at the transfer portion 52 and the bladder portion 80. The cushion 50 preferably also includes noninflatable portions 48 positioned between the transfer tubes 54, 60, the bladder housing 42 and the cross tube 62. The noninflatable portions 48 are preferably a single layer of fabric and preferably consist of the outboard panel 25 of the cushion 50. Advantageously, the inflatable portions of the cushion 50 being the transfer portion 52 and the bladder portion 80 provide selected inflated cover of the interior vehicle side structure 22 at selected times while the noninflatable portions 48 provide lateral stiffness to the entire cushion 50 and provide a barrier which can retain or catch the head of a restrained vehicle passenger during a primary or secondary event which directs the occupant towards the side of the vehicle 10. Also, the noninflatable portions 48 provide lateral stability to the bladder portion 80 during sustained inflation of the bladder portion 80. Advantageously, the partially inflatable cushion 50 having noninflatable portions 48 requires a lesser amount of inflation gas than fully inflatable cushions. Advantageously, the partially inflatable cushion 50 can be inflated quickly and efficiently in selected locations such that the cushion 50 preferably can provide overall protection to the entire interior vehicle side structure 22 with a single cushion 50.

Figure 2:
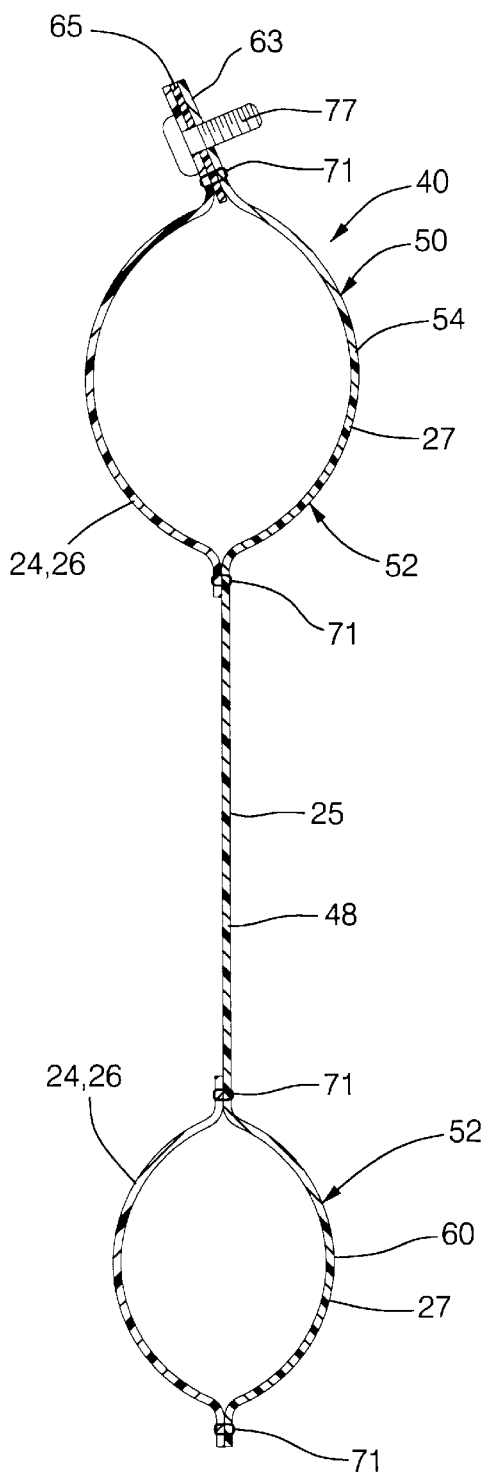
FIG. 2 is a sectional view taken along line 2—2 of FIG. 1.
Figure 3:
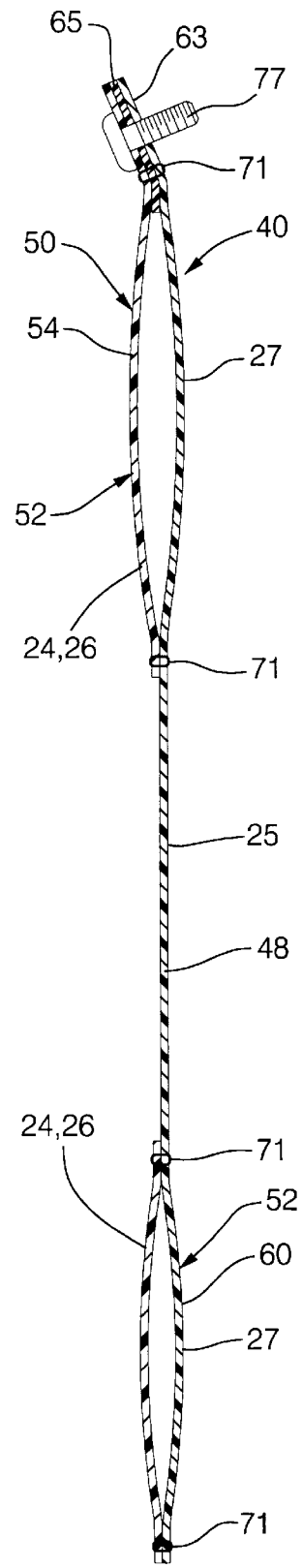
FIG. 3 is a sectional view similar to FIG. 2, but taken when the bladder portion is in the fully inflated condition and when the transfer portion is in the substantially deflated condition.

Advantageously, the side restraint assembly 40 functions in the following manner. Upon the sensing of a predetermined amount of vehicle deceleration in a side direction, the inflator 34 is triggered to discharge inflation gas. The inflatable transfer portion 52 at the entry portion 53 is in fluid communication with the inflator 34 for initial inflation by the inflation gas. As best shown in FIG. 1, the inflation gas travels along the upper and lower transfer tubes 54, 60. The transfer portion 52 provides initial inflated coverage of a first predetermined vehicle location which is preferably shown as the C-pillar 16, roof rail 15, portions of the A-pillar 14 and portions of the B-pillar 17. In addition, in this initial inflated condition of the cushion 50, the noninflated portions 48 also provide lateral stability and side restraint, especially for the head of a vehicle occupant. As the transfer portion 52 including the upper and lower transfer tubes 54, 60, inflates, the cross tube 62 keeps the pressure equalized between the upper and lower transfer tubes 54, 56 such that both of the tubes 54, 60 become fully inflated and such that one of the tubes 54, 60 does not overinflate during initial inflation. Preferably, the entry portion 53 of the transfer tube is widened to provide additional protection for a rear seat occupant and also such that the quickly discharging inflation gas does not overinflate the entry portion 53 of the cushion 50 before the inflation gas is distributed into the transfer tubes 54, 60. FIG. 2 shows the upper and lower transfer tubes 54, 60 in a fully inflated condition during initial inflation of the cushion 50. FIG. 4 shows the fully inflated upper transfer tube 54 during initial inflation which is adjacent the A-pillar 14. Inflation gas is transferred from the upper and lower transfer tubes 54, 60 into the upper and lower bladder connector tubes 55, 56. Advantageously, the inflation gas must initially pass through the transfer portion 52 prior to entry into the bladder portion 80 such that the transfer portion 52 also serves as a shock and heat dissipater and catcher for any combustion particles from the inflator 34 that could damage or melt the bladder portion 80. Most preferably, the length and curving of the transfer portion 52 causes any combustion particles to be caught and imbedded in the transfer portion 52 prior to arrival at the bladder portion 80.

Referring to FIGS. 1, 6, 7, 10 and 11, as the transfer portion 52 including the upper and lower transfer tubes 54, 60 and the upper and lower bladder connector tubes 55, 56 becomes fully inflated, inflation gas is transferred into the bladder portion 80. Inflation gas is received in the bladder portion 80 through the bladder opening 81 from the matably aligned transfer opening 57 at the filler neck portion 58 as best shown in FIGS. 10 and 11. Thus, the bladder portion 80 is in fluid communication with the transfer portion 52 for inflation by transfer of inflation gas from the transfer portion 52 into the bladder portion 80. It will be appreciated that during initial inflation shown in FIGS. 1, 2, 4, 6, 7, 10 and 11, the transfer portion 52 is fully inflated and the bladder portion 80 is partially inflated as gas is transferred into the bladder portion 80 from the transfer portion 52. During an initial impact event, both the fully inflated transfer portion 52 and the partially inflated bladder portion 80 provide selected inflated coverage to a substantial portion of the vehicle interior which may be contacted during an initial impact event.

As best shown in FIGS. 8, 9, 12, and 13, the bladder portion 80 has a fully inflated condition in which the bladder portion 80 generally conforms to the shape of the bladder housing 42. Preferably, the bladder portion 80 has a volume which is greater than the volume of the bladder housing 42 such that the bladder portion 80 is limited in the fully inflated condition by the radial constraint asserted on the bladder portion 80 by the bladder housing 42. Thus, the bladder portion 80 cannot become over inflated and does not become fully tensioned and preferably includes wrinkled portions 82 which may be located any place on the bladder portion 80, but are most typically located at the upper and lower corners of the bladder housing 42. In addition, the bladder housing 42 protects the thin and delicate film material of the bladder portion 80 from damage before and during deployment. Advantageously, bladder portion 80 engages and seals the transfer portion 52, especially at the bladder connector tubes 55, 56 and filler neck portion 58 to limit the amount of gas further transferred into the bladder portion 80 and to seal the bladder portion 80 for sustained inflation of the bladder portion 80 during secondary impact events. As best shown in FIGS. 8, 9, 12 and 13, the fully inflated bladder portion 80 presses the inboard transfer wall 26 against the outboard transfer wall 27 and deflates the transfer portion 52 such that the transfer portion 52 is squeezed or pinched off and can no longer transfer gas into the bladder portion 80. The enlarged area at the filler neck portion 58 assists in permitting the bladder portion 80 to seal off the transfer portion 52 at the transfer opening 57, especially in the area of the bladder connector tubes 55, 56 and the filler neck portion 58. The bladder portion 80 is self-sealing since in the fully inflated condition it pinches off the transfer portion 52 and subsequently the bladder portion 80 remains inflated for a sustained period of time after the transfer portion 52 is substantially deflated. Thus, the bladder portion 80 provides lengthened and extended inflated coverage of a predetermined portion of the interior vehicle side structure 22, preferably shown in the location of the B-pillar 17 for protection of occupants during secondary events, such as a vehicle roll, even after deflation of the transfer portion 52.

Advantageously, the bladder portion 80 binds up on itself and is self-sealing like a balloon whose mouth is blocked such that inflation gas cannot quickly escape from the bladder portion 80. At the same time, the bladder opening 81 advantageously provides a slow leak path to the bladder portion 80 such that the bladder portion 80 does not remain extremely hard and rigid when it is struck by an object, but very slowly deflates while absorbing energy. Also advantageously, the harder that the bladder portion 80 is struck by an object, the higher the pressure on the bladder portion 80 that causes the bladder portion 80 to further bind up onto itself, close off the transfer portion 52 and seal off the bladder opening 81 such that the leak path is further slowed and the bladder portion 80 holds inflation gas longer. The bladder housing 42 also assists in the self-sealing of the bladder portion 80 since the bladder housing 42 provides a reaction surface against which the bladder portion 80 can react and allows the bladder portion 80 to squeeze the inboard transfer wall 26 of the transfer portion 52 shut against the outboard panel 25 which also provides the outboard transfer wall 27 and the outboard bladder housing wall 29. This is further enabled by the tubular-shaped transfer portion 52 which is biased towards returning to its natural, uninflated state. This is also assisted by the coating of the cushion fabric, especially wherever the inboard and outboard panels 24, 25 are pressed against directly or indirectly by the inflated bladder portion 80 such that the coated surfaces tend to stick together to keep the transfer portion 52 sealed when the bladder portion 80 is fully inflated. The sealing is also assisted by the use of a nonporous material for the bladder portion 80 having no leak paths except a controlled leak path at the bladder opening 81.

It will be understood that a person skilled in the art may make modifications to the preferred embodiment shown herein within the scope and intent of the claims. For example, although the preferred embodiment shows the cushion 50 preferably covering the entire interior vehicle side structure 22 from the C-pillar 16 forward to a portion of the A-pillar 14 with the bladder portion 80 at a generally central location at the B-pillar 17, it will be appreciated that many other arrangements which provide vehicle interior coverage are possible. For example, the cushion 50 could be generally flipped 180 degrees so that fully inflated coverage is provided over the A-pillar 14 and partial inflated coverage is provided over the C-pillar 16. In addition, the inflator 34 could alternately be mounted in the A-pillar 14 area. Furthermore it will be appreciated that the inflator 34 could be mounted anywhere that is in fluid communication with the transfer portion 52. As another example, if the inflated coverage of transfer portion 52 is extended down the entire A-pillar 14 in addition to the entire C-pillar 16, an inflator 34 could be provided at both the A-pillar 14 and the C-pillar 16. It will further be appreciated that the cushion 50 could be arranged to cover the rear half of the vehicle 10 from the B-pillar 17 to the C-pillar 16 in which case the bladder portion 80 could be moved rearward or the cushion 50 could be arranged to cover the front half of the vehicle 10 from the B-pillar 17 to the A-pillar 14 in which case the bladder portion 80 could be moved forward. For example, the bladder portion 80 could be placed over the front side window 19 area and the transfer portion 52 could be tubes that run along the A-pillar 14, roof rail 15 and B-pillar 17. Thus, it will be appreciated that many arrangements are possible.

Preferably, the transfer portion 52 and partially inflated bladder portion 80 provide initial inflated coverage to first predetermined selected vehicle locations, such as the roof rail 15 and pillars 14, 16 or 17 and then the bladder portion 80 is selectively located to provide sustained, extended protection to second predetermined selected vehicle locations such as the B-pillar 17 area. It will be appreciated that certain areas of the vehicle 10 may be included for both initial and extended coverage, such as the B-pillar 17. It will further be appreciated that multiple bladder portions 80 for extended coverage in selected locations are also possible. Furthermore, different predetermined areas of the vehicle side structure 22 could be selected for initial or extended coverage by the transfer portion 52 and the bladder portion 80 and is not limited to the arrangements shown in the Figures. For example, the bladder portion 80 could provide initial and extended inflated coverage to the roof rail 15 while the transfer portion 52 provides initial inflated coverage to the B-pillar 17, A-pillar 14 or C-pillar. A multitude of variations are possible.

It will further be appreciated that while the cross tube 62 is preferred for equalization of inflation of the upper and lower transfer tubes 54, 60, the cross tube 62 could be eliminated or additional cross tubes 62 could be added. It will further be appreciated that although the cushion 50 includes upper and lower transfer tubes 54, 60, the transfer portion 52 could include a single tube or more than two tubes to provide selected initial coverage to predetermined vehicle locations so long as the transfer portion 52 transfers gas into the bladder portion 80 and inflation of the bladder portion 80 seals off the transfer portion 52 to retain inflation gas in the bladder portion 80. It will further be appreciated that while the transfer portion 52 is preferably shown as tubular, that other shapes are possible and that a widened portion may preferably be provided near the connection to the inflator 34 to reduce initial stresses on the cushion 50. Also it will be appreciated that the upper transfer tube 54 may be narrowed at the area of the A-pillar 14 such that the transfer portion 52 requires less inflation gas to be delivered to this point which is furthest away from the inflator 34 location. While the bladder portion 80 is preferably made of a polyethylene or mylar film, it will be appreciated that other bladder materials are possible. For example, the bladder portion could be made of a coated fabric with leak-proof seams that are sealed by a dip, spray or other sealing process.

Figure 15:
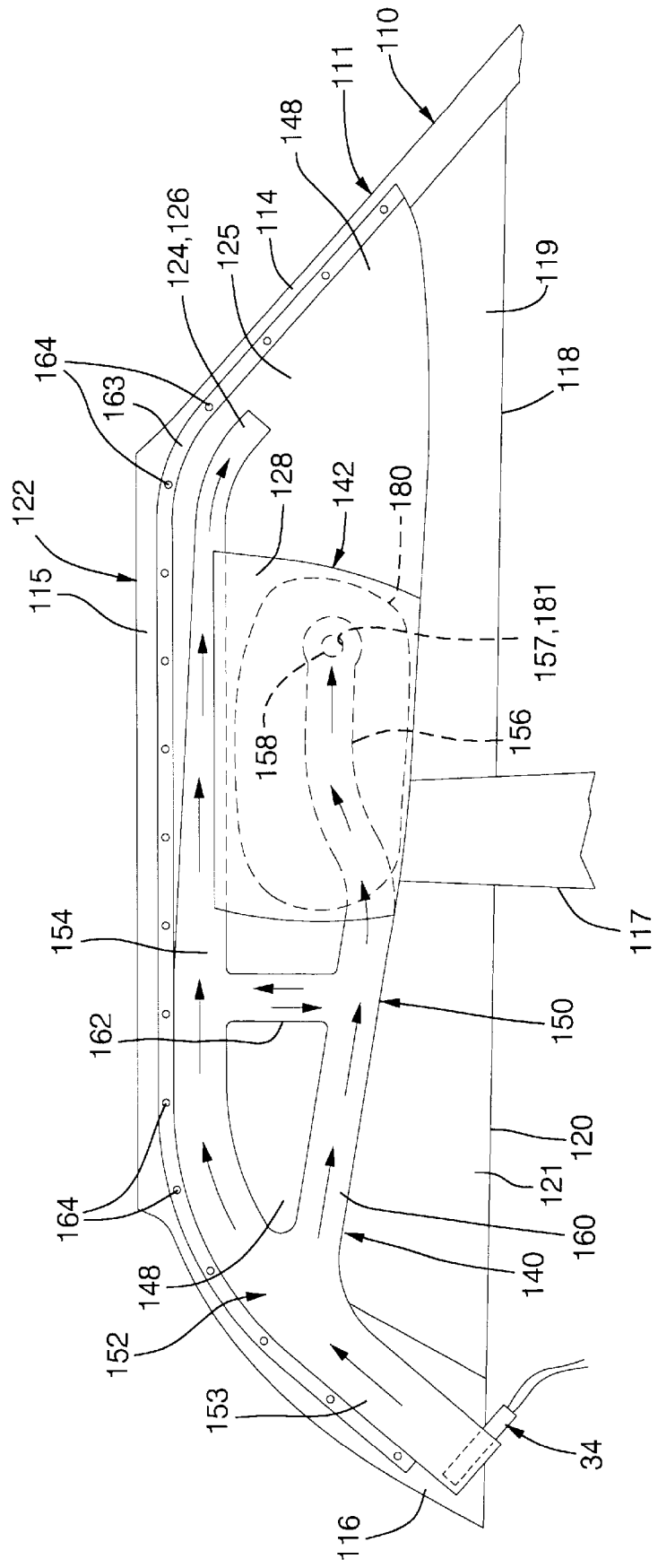
FIG. 15 shows a view similar to FIG. 1, but showing an alternate embodiment of the restraint assembly.

FIG. 15 shows an alternate embodiment of the invention which has a similar description and function to the embodiment shown in FIGS. 1–14. Similar features having similar descriptions are denoted by similar numerals increased by one hundred. The embodiment shown in FIG. 15 differs in that the lower transfer tube 160 and the upper transfer tube 154 do not intersect each other at the bladder opening 181. Instead, the lower transfer tube 160 continues forward to provide a single bladder connector portion 156 which preferably extends along most of the longitudinal length of the bladder portion 180 and is located at a location furthest away from the inflator 134. The bladder connector portion 156 terminates in the filler neck portion 158 which has the transfer opening 157 aligned with the bladder opening 181 for transfer of inflation gas from the transfer portion 152 into the bladder portion 180. Advantageously, the bladder connector tube 156 extends along the length of the bladder portion 180 and gets squeezed or pinched off by the fully inflated bladder portion 180 along most of the length for sustained inflation of the bladder portion 180. It will further be appreciated that the upper transfer tube 154 extends forward towards the A-pillar 114 and becomes narrower as it moves away from the inflator 134 such that less inflation gas is needed at the location of the transfer portion 152 which is furthest away from the inflator 134. The cushion 150 provides selected initial inflated coverage to the C-pillar 116, B-pillar 117, and portions of the A-pillar 114 by the fully inflated transfer portion 152 and also provides selected initial inflated coverage to the B-pillar 117 and portions of the front side window 119 by the partially inflated bladder portion 180. As gas is transferred into the bladder portion 180 from the transfer portion 152 and the bladder portion 180 becomes fully inflated and self-seals and squeezes closed the path to the transfer portion 152, as described in detail above, the bladder portion 180 provides extended, sustained coverage to predetermined selected vehicle locations such as the B-pillar 117 and the front side window 119.

Figure 16:
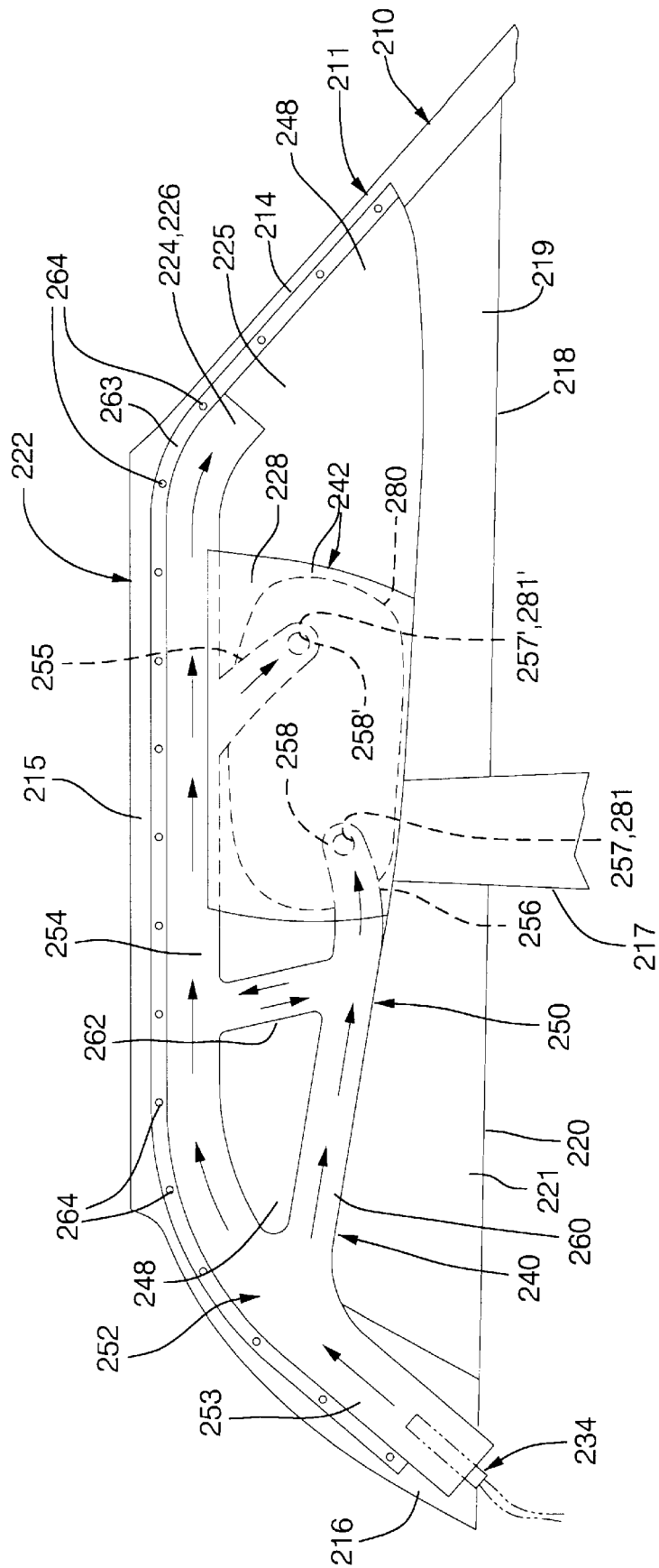
FIG. 16 shows a view similar to FIG. 1, but showing another alternate embodiment of the restraint assembly.

FIG. 16 shows another alternate embodiment of the invention which has a similar description and function to the embodiment shown in FIGS. 1–14. Similar features having similar descriptions are denoted by similar numerals increased by two hundred. The embodiment shown in FIG. 16 differs in that a lower transfer tube 260 and an upper transfer tube 254 do not intersect each other at the bladder opening 281. Instead, the lower transfer tube 260 continues forward and upward to provide the lower bladder connector portion 256 which preferably extends along a lower portion of the longitudinal length of the bladder portion 280. The lower bladder connector portion 256 terminates in a filler neck portion 258 which has a transfer opening 257 aligned with the bladder opening 281 for transfer of inflation gas from the transfer portion 252 into the bladder portion 280. In addition, the upper transfer tube 260 continues forward and downward to provide the upper bladder connector portion 255 which preferably extends along an upper portion of the longitudinal length of the bladder portion 280. The upper bladder connector portion 255 terminates in another filler neck portion 258' which also has a transfer opening 257' aligned with the bladder opening 281' for transfer of inflation gas from the transfer portion 252 into the bladder portion 280. Thus, this embodiment includes two bladder openings 281, 281' through which inflation gas can be received into the bladder portion 280. Furthermore, this embodiment shows an example of an inflator 234 which is in line with the entry portion 253 of the cushion 250. Advantageously, both bladder connector tubes 255, 256 get squeezed or pinched off by the fully inflated bladder portion 280 for sustained inflation of the bladder portion 280, in a manner as described in detail above with respect to FIGS. 1–14. The cushion 250 provides selected initial inflated coverage to the C-pillar 216, B-pillar 217, and portions of the A-pillar 214 by the fully inflated transfer portion 252 and also provides selected initial inflated coverage to the B-pillar 217 and portions of the front side window 219 by the partially inflated bladder portion 280. As gas is transferred into the bladder portion 280 from the transfer portion 252 and the bladder portion 280 becomes fully inflated and self-seals and squeezes closed the path to the transfer portion 252, as described in detail above, the bladder portion 280 provides extended, sustained coverage to predetermined selected vehicle locations such as the B-pillar 217 and the front side window 219.

Figure 17:
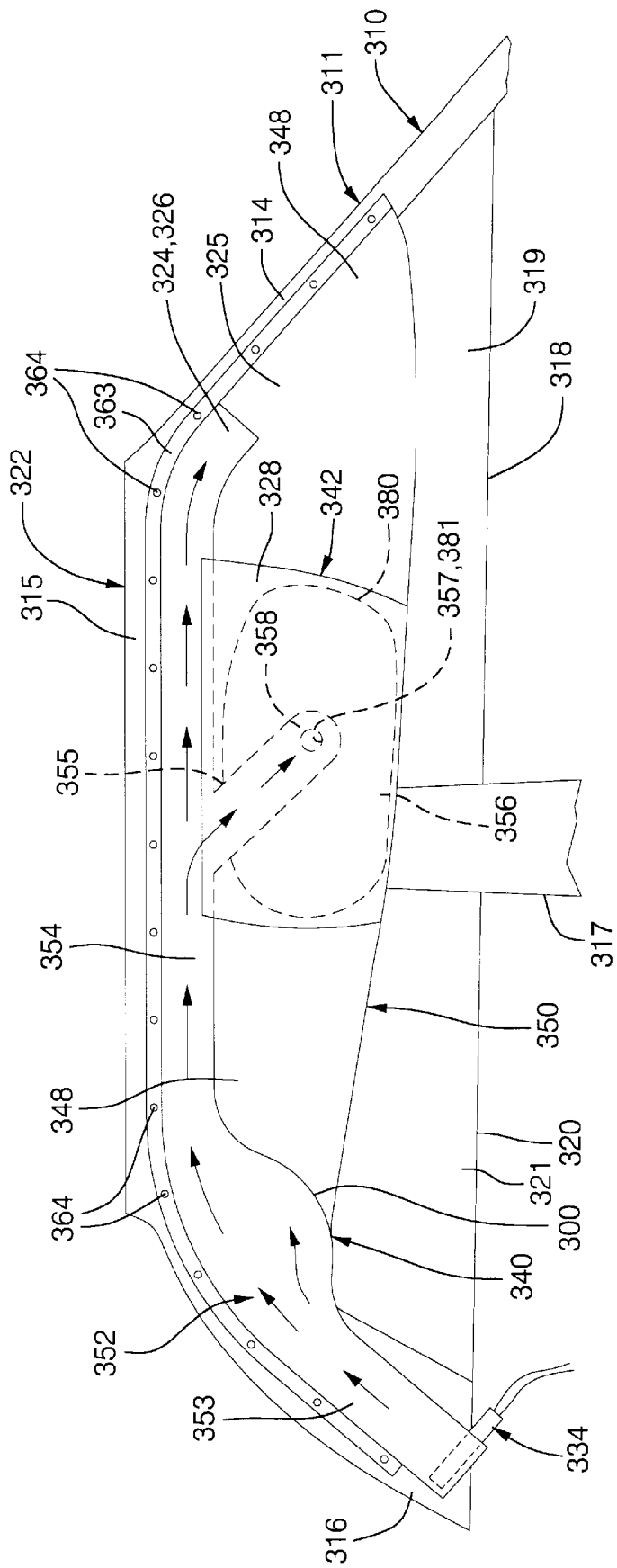
FIG. 17 shows a view similar to FIG. 1, but showing yet another alternate embodiment of the restraint assembly.

FIG. 17 shows yet another alternate embodiment of the invention which has a similar description and function to the embodiment shown in FIGS. 1–14. Similar features having similar descriptions are denoted by similar numerals increased by three hundred. The embodiment shown in FIG. 17 differs in that the lower transfer tube is eliminated. Instead, the upper transfer tube 354 continues forward to provide a single bladder connector portion 355 which extends forward and downward into the bladder portion 380. The bladder connector portion 355 terminates in the filler neck portion 358 which has the transfer opening 357 aligned with the bladder opening 381 for transfer of inflation gas from the transfer portion 352 into the bladder portion 380. The cushion 350 provides selected initial inflated coverage to the C-pillar 316, B-pillar 317, and portions of the A-pillar 314 by the fully inflated transfer portion 352 and also provides selected initial inflated coverage to the B-pillar 317 and portions of the front side window 319 by the partially inflated bladder portion 380. As gas is transferred into the bladder portion 380 from the transfer portion 352 and the bladder portion 380 becomes fully inflated and self-seals and squeezes closed the path to the transfer portion 352, as described in detail above, the bladder portion 380 provides extended, sustained coverage to predetermined selected vehicle locations such as the B-pillar 317 and the front side window 319. In addition, the embodiment shown in FIG. 17 includes an enlarged portion 300 which provides added initial inflated coverage in the location of the C-pillar 316 for additional protection of a rear seat occupant. Also, the cross tube is eliminated in this embodiment since there is not a lower transfer tube.

Figure 18:
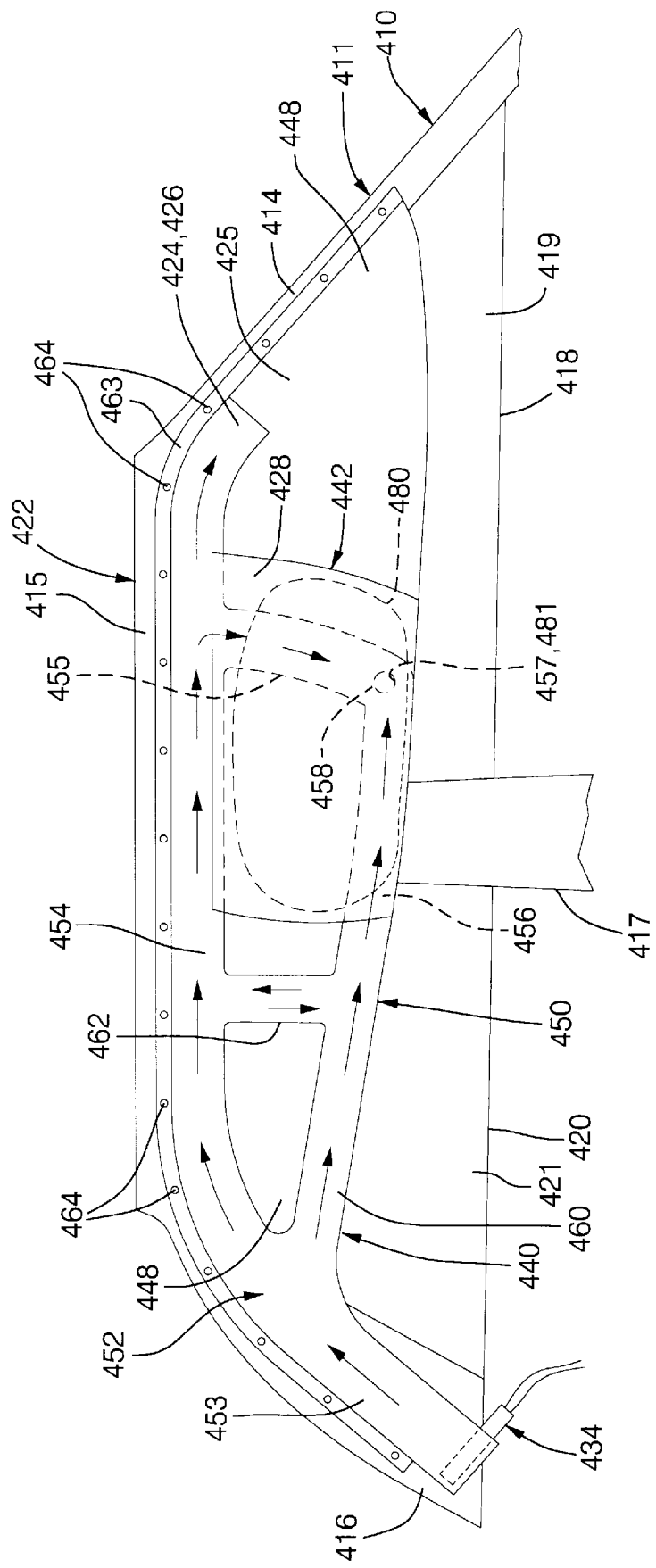
FIG. 18 shows a view similar to FIG. 1, but showing still a further alternate embodiment of the restraint assembly.

FIG. 18 shows still a further alternate embodiment of the invention which has a similar description and function to the embodiment shown in FIGS. 1–14. Similar features having similar descriptions are denoted by similar numerals increased by four hundred. The embodiment shown in FIG. 18 differs in that the lower transfer tube 460 and the lower bladder connector portion 456 extend generally straight and forward across the lower edge of the bladder portion 480 and the upper bladder connector portion 455 turns sharply downward from the upper transfer tube 454 and intersects the lower bladder connector portion 456 at the lower edge of the bladder portion 480 at the bladder opening 481. The bladder connector portions 455, 456 terminate at the filler neck portion 458 which has the transfer opening 457 aligned with the bladder opening 481 for transfer of inflation gas from the transfer portion 452 into the bladder portion 480 at the lower edge of the bladder portion 480. Advantageously, the bladder connector tubes 455, 456 extend substantially along the entire vertical and longitudinal lengths of the bladder portion 480, respectively, and both get squeezed or pinched off by the fully inflated bladder portion 480 along most of its length and height for sustained inflation of the bladder portion 480. The cushion 450 provides selected initial inflated coverage to the C-pillar 416, B-pillar 417, and portions of the A-pillar 414 by the fully inflated transfer portion 452 and also provides selected initial inflated coverage to the B-pillar 417 and portions of the front side window 419 by the partially inflated bladder portion 480. As gas is transferred into the bladder portion 480 from the transfer 452 and the bladder portion 480 becomes fully inflated and self-seals and squeezes closed the path to the transfer 452, as described in detail above, the bladder portion 480 provides extended, sustained coverage to predetermined selected vehicle locations such as the B-pillar 417 and the front side window 419.

While the present invention has been described as carried out in a specific embodiment thereof, it is not intended to be limited thereby but is intended to cover the invention broadly within the scope and spirit of the appended claims.

What is claimed is:

1. A restraint assembly for use in a vehicle, the restraint assembly including an inflator for generating inflation gas, the restraint assembly characterized by a restraint cushion including an inflatable transfer portion in fluid communication with the inflator for initial inflation by the inflation gas, and an inflatable bladder portion in fluid communication with the transfer portion for extended inflation by transfer of inflation gas from the transfer portion into the bladder portion, the bladder portion having a fully inflated condition in which the bladder portion is filled with inflation gas from the transfer portion and in which the bladder portion engages the transfer portion to limit the amount of gas further transferred into the bladder portion and to seal the bladder portion such that inflation gas is held in the bladder portion for lengthened and extended inflation of the bladder portion.

2. A restraint assembly for use in a vehicle, the restraint assembly including an inflator for generating inflation gas, the restraint assembly characterized by a restraint cushion including an inflatable transfer portion in fluid communication with the inflator for initial inflation by the inflation gas, and an inflatable bladder portion being in fluid communication with the transfer portion such that inflation gas is transferred from the transfer portion into the bladder portion for inflation of the bladder portion; and the bladder portion having a fully inflated condition in which the bladder portion is filled with inflation gas from the transfer portion and in which the bladder portion engages the transfer portion to limit the amount of gas further transferred into the bladder portion and to seal the bladder portion for lengthened and extended inflation of the bladder portion subsequent to deflation of the transfer portion.

3. The restraint assembly of claim 2 wherein the transfer portion provides inflated coverage of a predetermined first vehicle location and wherein the bladder portion provides initial and extended inflated coverage of a predetermined second vehicle location.

4. The restraint assembly of claim 3 wherein the transfer portion includes at least one transfer opening and wherein the bladder portion includes at least one bladder opening and wherein the transfer opening and the bladder opening are matably aligned with each other for transfer of inflation gas from the transfer portion into the bladder portion.

5. The restraint assembly of claim 3 wherein the cushion includes an outboard panel and an inboard panel selectively attached to the outboard panel to provide the transfer portion.

6. The restraint assembly of claim 3 wherein the transfer portion includes at least one bladder connector tube for transferring inflation gas into the bladder portion and wherein the bladder connector tube is located directly outboard of the bladder portion.

7. A restraint assembly for use in a vehicle, the restraint assembly including an inflator for generating inflation gas, the restraint assembly characterized by a restraint cushion including an inflatable transfer portion in fluid communication with the inflator for initial inflation by the inflation gas, and an inflatable bladder portion being in fluid communication with the transfer portion such that inflation gas is transferred from the transfer portion into the bladder portion for inflation of the bladder portion; and the transfer portion includeing an inboard transfer wall and an outboard transfer wall and wherein the bladder portion is positioned inboard of the inboard transfer wall and wherein the bladder portion has a fully inflated condition in which the bladder portion forces the inboard and outboard walls of the transfer portion together to substantially seal off the continued transfer of inflation gas into the bladder portion and to provide extended and lengthened inflation of the bladder portion after deflation of the transfer portion.

8. A restraint assembly for use in a vehicle, the restraint assembly including an inflator for generating inflation gas, the restraint assembly characterized by a restraint cushion including an inflatable transfer portion in fluid communication with the inflator for initial inflation by the inflation gas, and an inflatable bladder portion being in fluid communication with the transfer portion such that inflation gas is transferred from the transfer portion into the bladder portion for inflation of the bladder portion; and the cushion includeing a bladder housing enclosing the bladder portion.

9. The restraint assembly of claim 8 wherein the bladder portion floats within the bladder housing and lacks direct securement to the bladder housing.

10. The restraint assembly of claim 8 wherein the bladder portion has a volume which is greater than a volume of the bladder housing such that the bladder portion is constrained by the bladder housing and conforms to the shape of the bladder housing when the bladder portion is fully inflated.

11. The restraint assembly of claim 10 wherein the bladder portion includes wrinkled portions when the bladder portion is in the fully inflated condition due to the constraints of the bladder housing.

12. The restraint assembly of claim 8 wherein the transfer portion is at least partially located between the bladder housing and the bladder portion.

13. The restraint assembly of claim 8 wherein the transfer portion is at least partially formed by the bladder housing.

14. The restraint assembly of claim 8 wherein the cushion includes an outboard panel partially providing the bladder housing and partially providing the transfer portion.

15. The restraint assembly of claim 8 wherein the bladder portion is made of a thin and flexible film of plastic material.

16. The restraint assembly of claim 8 wherein the bladder portion is made of a thin layer of polyethylene film.

17. The restraint assembly of claim 8 wherein the bladder portion is made of a thin layer of mylar film.

18. The restraint assembly of claim 8 wherein the bladder portion is made of a thin layer of plastic film and wherein the transfer portion is made of a woven fabric material.

19. A restraint assembly for use in a vehicle, the restraint assembly including an inflator for generating inflation gas, the restraint assembly characterized by a restraint cushion including an inflatable transfer portion in fluid communication with the inflator for initial inflation by the inflation gas, and an inflatable bladder portion being in fluid communication with the transfer portion such that inflation gas is transferred from the transfer portion into the bladder portion for inflation of the bladder portion; and the cushion includeing an outboard panel and wherein the transfer portion includes an outboard transfer wall defined by the outboard panel and wherein the cushion includes a bladder housing for capturing the bladder portion therein and wherein the bladder housing is integrally formed by the outboard panel.

20. A restraint assembly for use in a vehicle, the restraint assembly including an inflator for generating inflation gas, the restraint assembly characterized by a restraint cushion including an inflatable transfer portion in fluid communication with the inflator for initial inflation by the inflation gas, and an inflatable bladder portion being in fluid communication with the transfer portion such that inflation gas is transferred from the transfer portion into the bladder portion for inflation of the bladder portion; and the transfer portion includeing at least one bladder connector tube including a transfer opening through which inflation gas is transferred into the bladder portion and wherein the bladder portion has a fully inflated condition in which the inflated bladder portion pinches and seals off the bladder connector tube for substantially closing fluid communication between the bladder portion and the transfer portion such that the bladder portion sustains lengthened and extended inflation after deflation of the transfer portion.

21. A side restraint assembly for use in a vehicle, the restraint assembly including an inflator for generating inflation gas, the restraint assembly characterized by a restraint cushion including an inflatable transfer portion in fluid communication with the inflator for initial inflation by the inflation gas, the transfer portion providing initial inflated coverage of a first predetermined vehicle location and an inflatable bladder portion in fluid communication with the transfer portion for inflation by transfer of inflation gas from the transfer portion into the bladder portion, the bladder portion for providing lengthened, extended inflated coverage of a second predetermined vehicle location; and the bladder portion having a fully inflated condition in which the bladder portion is filled with inflation gas from the transfer portion and in which the bladder portion engages and seals the transfer portion to limit the amount of gas further transferred into the bladder portion and to seal the bladder portion for lengthened and extended inflation of the bladder portion after deflation of the transfer portion.

22. The side restraint assembly of claim 21 wherein the restraint cushion includes an outboard panel and an inboard panel and wherein the inboard panel is selectively attached to the outboard panel to form the transfer portion.

23. The side restraint assembly of claim 21 wherein the cushion includes noninflatable portions for providing lateral stiffness to the transfer portion and bladder portion.

24. A side restraint assembly for use in a vehicle, the restraint assembly including an inflator for generating inflation gas, the restraint assembly characterized by a restraint cushion including an inflatable transfer portion in fluid communication with the inflator for initial inflation by the inflation gas, the transfer portion providing initial inflated coverage of a first predetermined vehicle location and an inflatable bladder portion in fluid communication with the transfer portion for inflation by transfer of inflation gas from the transfer portion into the bladder portion, the bladder portion for providing lengthened, extended inflated coverage of a second predetermined vehicle location; and the cushion includeing a bladder housing for enclosing the bladder portion but lacking direct connection thereto and wherein the bladder portion is formed separate from the bladder housing and is directly connected to the transfer portion.

25. A side restraint assembly for use in a vehicle, the restraint assembly including an inflator for generating inflation gas, the restraint assembly characterized by a restraint cushion including an inflatable transfer portion in fluid communication with the inflator for initial inflation by the inflation gas, the transfer portion providing initial inflated coverage of a first predetermined vehicle location and an inflatable bladder portion in fluid communication with the transfer portion for inflation by transfer of inflation gas from the transfer portion into the bladder portion, the bladder portion for providing lengthened, extended inflated coverage of a second predetermined vehicle location;

the cushion including a bladder housing for enclosing the bladder portion but lacking direct connection thereto and wherein the bladder portion is formed separate from the bladder housing and is directly connected to the transfer portion; and the bladder portion having a volume which is larger than a volume of the bladder housing such that when the bladder portion is in the fully inflated condition, the bladder portion conforms to the shape of the bladder housing to prevent overextension of the bladder portion.

* * * * *